(12) United States Patent
Doyle et al.

(10) Patent No.: US 8,154,680 B2
(45) Date of Patent: Apr. 10, 2012

(54) ELECTRONIC DEVICE DISPLAY STRUCTURES WITH CONTROLLED CHASSIS REFLECTIONS

(75) Inventors: David A. Doyle, Los Gatos, CA (US); Joshua G. Wurzel, Sunnyvale, CA (US); Shawn R. Gettemy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 12/760,950

(22) Filed: Apr. 15, 2010

(65) Prior Publication Data
US 2011/0255023 A1 Oct. 20, 2011

(51) Int. Cl.
*G02F 1/1333* (2006.01)
(52) U.S. Cl. ............... 349/58; 349/61; 349/56; 349/137
(58) Field of Classification Search ............ 349/56, 349/58, 61, 64, 65, 112, 113, 137
See application file for complete search history.

(56) References Cited

U.S. PATENT DOCUMENTS

| | | | |
|---|---|---|---|
| 4,812,830 A | 3/1989 | Doering | |
| 5,422,751 A | 6/1995 | Lewis et al. | |
| 6,061,231 A | 5/2000 | Crockett | |
| 6,071,616 A * | 6/2000 | Sulzbach et al. | 428/408 |
| 6,280,885 B1 * | 8/2001 | Gordon | 430/5 |
| 7,071,927 B2 * | 7/2006 | Blanchard | 345/173 |
| 8,051,980 B2 * | 11/2011 | Tai et al. | 206/320 |
| 2002/0145762 A1 * | 10/2002 | Hsu et al. | 358/302 |
| 2003/0164894 A1 * | 9/2003 | Hsu et al. | 348/374 |
| 2006/0158511 A1 | 7/2006 | Harrold et al. | |
| 2011/0255023 A1 * | 10/2011 | Doyle et al. | 349/58 |

OTHER PUBLICATIONS

M.G. Lee et al., "Optical Characteristics of holographic light-guide plate for LCD," Eurodisplay 2002, 343-346 (2002).
Gettemy et al., U.S. Appl. No. 12/558,193, filed Sep. 11, 2009.

* cited by examiner

*Primary Examiner* — Brian Healy
(74) *Attorney, Agent, or Firm* — Treyz Law Group; G. Victor Treyz

(57) ABSTRACT

A display may be based on a display unit that is mounted within a chassis. The display unit may be a liquid crystal display unit. A backlight may be used to illuminate the display unit. The backlight may include a light guide plate. Light from a light source may be launched into an edge of the light guide plate. Scattered light from the light guide plate may travel vertically along a vertical axis that is perpendicular to the plane that contains the light guide plate. The scattered light may pass through the display unit and may serve as backlight for the display. The light guide plate may be mounted within a rectangular opening in the chassis. The edges of the rectangular opening and the edges of the light guide plate may be configured to reduce excessive reflections. These edges may have reflection-reducing coatings, non-planar surfaces, and other reflection-reducing configurations.

20 Claims, 9 Drawing Sheets

ELECTRONIC DEVICE DISPLAY STRUCTURES WITH CONTROLLED CHASSIS REFLECTIONS

BACKGROUND

This relates generally to electronic devices, and more particularly, to display structures within electronic devices.

Electronic devices such as handheld electronic devices often include displays. For example, a cellular telephone may have a touch screen display that is based on a backlit liquid crystal display unit. This type of display has an array of addressable liquid crystal pixels. A backlight provides light for the display. When the backlight is active, light from the backlight is transmitted through the liquid crystal array for viewing by a user.

Backlights for displays are often based on light-emitting diodes (LEDs). An LED-based backlight includes a light guide plate formed from a material such as polycarbonate and an LED light source. The LED light source emits light into one of the edges of the light guide plate. The light guide plate distributes the LED light through the liquid crystal array.

The liquid crystal array, the light guide plate, and other display structures are typically mounted within a plastic chassis ("p-chassis"). At the edges of the light guide plate, some of the light escapes and strikes the chassis. The chassis has sidewalls that reflect the escaping light back into the light guide plate. The light reflected from the chassis tends to create an undesirable bright stripe of excessive light intensity along the edge of the light guide plate. A masking structure such as an enlarged bezel could be used to block the light in the bright stripe, but large bezels add bulk and tend not to be aesthetically appealing.

It would therefore be desirable to provide improved displays for electronic devices.

SUMMARY

Displays may be provided with backlights. For example, a liquid crystal display may have a backlit liquid crystal display unit. The liquid crystal display unit may have a liquid crystal layer interposed between respective glass layers. An array of electrodes may be used form an array of controllable pixels for the liquid crystal display unit.

Illumination for the liquid crystal display unit may be provided by a backlight. The backlight may be formed from a light guide plate. The light guide plate may be mounted on a reflector. A light source such as a light-emitting diode source may be used to launch light into an edge of the light guide plate. Some of the light that is launched into the light guide plate is confined by total internal reflection. Some of the launched light escapes downwards and is reflected upwards by the reflector. Light that is scattered upwards in the vertical direction passes through the liquid crystal display unit and serves as backlight for the display.

The light guide plate may be mounted in a rectangular opening in a chassis. The edges of the chassis and corresponding edges of the light guide plate may be configured to minimize excess light reflection. For example, the edges of the chassis may be oriented at non-zero angles with respect to a vertical axis. Coatings such as opaque ink layers and other layers of reflection-reducing material may be formed on the edges to reduce light reflections. Rectangular and curved undercuts, step shapes, textured surfaces, grooved surfaces, and other surfaces may also be used to minimize unwanted reflections. If desired, reflective coatings may be used to help direct reflected light in desired directions and thereby reduce unwanted excessive light intensity along the edges of the display.

Further features of the invention, its nature and various advantages will be more apparent from the accompanying drawings and the following detailed description of the preferred embodiments.

DETAILED DESCRIPTION

Displays such as liquid crystal displays have backlights. A display backlight includes a light guide plate mounted in a chassis.

A display may be provided with reflection control features that control the intensity of reflected light at the edges of the light guide plate. The reflection control features may be implemented using non-planar and angled chassis edges, non-planar and angled light guide plate edges, and coatings.

The displays in which the reflection control features are provided may be mounted in electronic devices in which it is desired to display visual information to a user. The electronic devices may, for example, be desktop computers, televisions, or other consumer electronics equipment. The electronic devices may also be portable electronic devices such as laptop computers and tablet computers. If desired, portable electronic devices may be somewhat smaller devices. Examples of smaller portable electronic devices include wrist-watch devices, pendant devices, headphone and earpiece devices, and other wearable and miniature devices. With one suitable arrangement, the portable electronic devices may be handheld electronic devices such as cellular telephones and media players.

Figure 1:
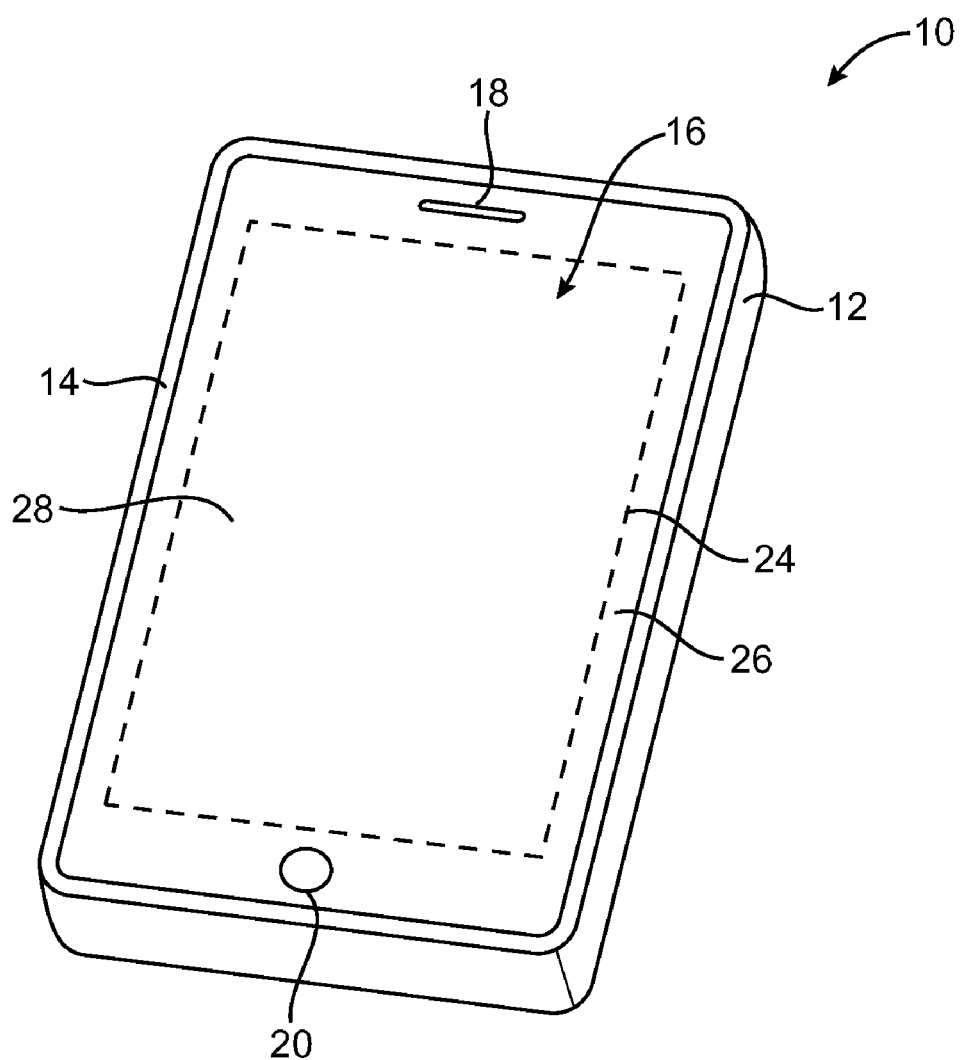
FIG. 1 is a perspective view of an illustrative electronic device that includes a display in accordance with an embodiment of the present invention.

Handheld electronic devices and other electronic devices may include displays to display text, graphics, video, interactive options, and other visual information to users. An illustrative electronic device of the type that may have a display is shown in FIG. 1. Device 10 of FIG. 1 may be, for example, a handheld electronic device such as a cellular telephone with circuitry that runs email and other communications applications, web browsing applications, media playback applications, games, etc.

Device 10 may have housing 12. Housing 12 may be formed of materials such as plastic, glass, ceramics, metal, carbon fiber composites and other composite materials, other suitable materials, or a combination of these materials. Housing 12 may be formed using a unibody construction in which most or all of the exterior of housing 12 and at least some of its interior structures are formed from a single piece of material (e.g., molded plastic, machined metal, cast or stamped metal with machined surfaces, etc.). Housing 12 may also be formed using a multi-piece construction in which portions of the housing are formed from separate parts (e.g., housing side walls, a rear housing surface, internal supports and frame structures, etc.).

Display 16 may be mounted on the front surface of device 10 and may, if desired, be surrounded by peripheral structures such as bezel 14. Bezel 14 may be formed from plastic, metal, portions of housing 12, or other cosmetic and structural elements. Bezel 14 may serve to hold display 16 on device 10. Bezel 14 may also form an aesthetically pleasing trim around the edge of device 10. If desired, displays such as display 16 may be mounted in housing 12 without using bezel 14.

Display 16 may be a liquid crystal display (LCD) or other display that includes a backlit array of active pixels. In a liquid crystal display, individual pixels in the array are addressed using driver circuits that control voltages on pixel electrodes in the array.

A protective outer layer of plastic or glass may be provided over the outermost surface of display 16 to protect display 16 from damage. This layer is sometimes referred to as a cover glass layer. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

If desired, electronic device 10 may include input-output devices such as button 20 and other buttons, input-output connectors for signal ports, a speaker port such as speaker port 18, microphone and camera ports, and other input-output devices.

In the example of FIG. 1, display 16 is shown as being mounted on the front face of handheld electronic device 10, but display 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

Display 16 may have an active central portion that contains image pixels and an inactive peripheral portion. No image is created in the inactive portion of the display. In the active central portion of the display, image pixels can be controlled to display a desired image. In the example of FIG. 1, active central rectangular portion 28 of display 16 lies within dashed rectangle 24. Inactive peripheral portion 26 of display 16 lies outside of rectangle 24. Peripheral portion 26 forms an inactive boundary that surrounds the rectangular active region. Components such as button 20 and speaker port 18 may be formed in this inactive boundary.

To block internal structures in the inactive regions of display 16 from view by a user of device 10, the cover glass of display 16 may be provided with an opaque mask. The opaque mask may be formed from a black ink or other substance that blocks visible light. The opaque mask may be formed over the inactive portions of display 16. For example, the periphery of the cover glass of display 16 may be provided with an interior coating of black ink. The portion of the cover glass that overlaps active region 28 may be uncovered with ink so that this region remains transparent. To ensure that device 10 has a compact and aesthetically pleasing design, it may be desirable to minimize the width of inactive border region 26 and the ring of associated black ink that is formed on the underside of the display cover glass.

Figure 2:
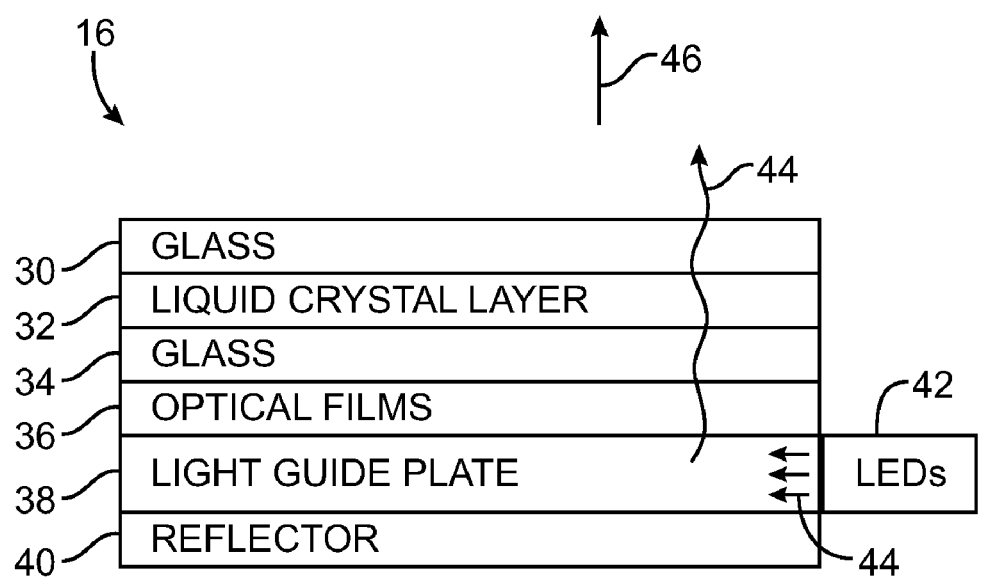
FIG. 2 is a cross-sectional side view of an illustrative display with a light-emitting diode backlight in accordance with an embodiment of the present invention.

A cross-sectional side view of portions of an illustrative display is shown in FIG. 2. As shown in FIG. 2, display 16 may include a liquid crystal layer such as layer 32. Liquid crystal layer 32 may be formed between upper glass layer 30 and lower glass layer 34. A backlight provides rear illumination for the liquid crystal layer. The backlight may include a light source such as light-emitting diode source 42, light guide plate 38, reflector 40, and optical films 36. Light source 42 produces visible light 44 (e.g., white light). Light 44 is launched into the interior of light guide plate 38 through a textured edge region of light guide plate 38.

Light guide plate 38 may be formed from a transparent dielectric such as transparent (translucent) plastic (e.g., polycarbonate, acrylic, cyclic olefin copolymer materials, etc.). The thickness of the light guide plate may be 0.2 to 0.5 mm or 0.1 to 1.0 mm (as examples). At least some of light 44 is confined within light guide plate 38 by total internal reflection. A pattern of light scattering structures may be formed on the light guide plate. The light scattering structures scatter the light that is traveling horizontally within light guide plate 38. Some of the scattered light exits light guide plate 38 and display 16 in vertical direction 46. Scattered light that exits the rear surface of light guide plate 38 is reflected in direction 46 by reflector 40. Reflector 40 may be formed from a metalized polymer sheet (e.g., a silvered sheet of acrylic or other polymer materials, a layer of metal, or a reflector sheet that is formed by alternating high index of refraction and low index of refraction layers). Optical films 36 may include a diffuser sheet that smoothes the light exiting the surface of display 16.

Figure 3:
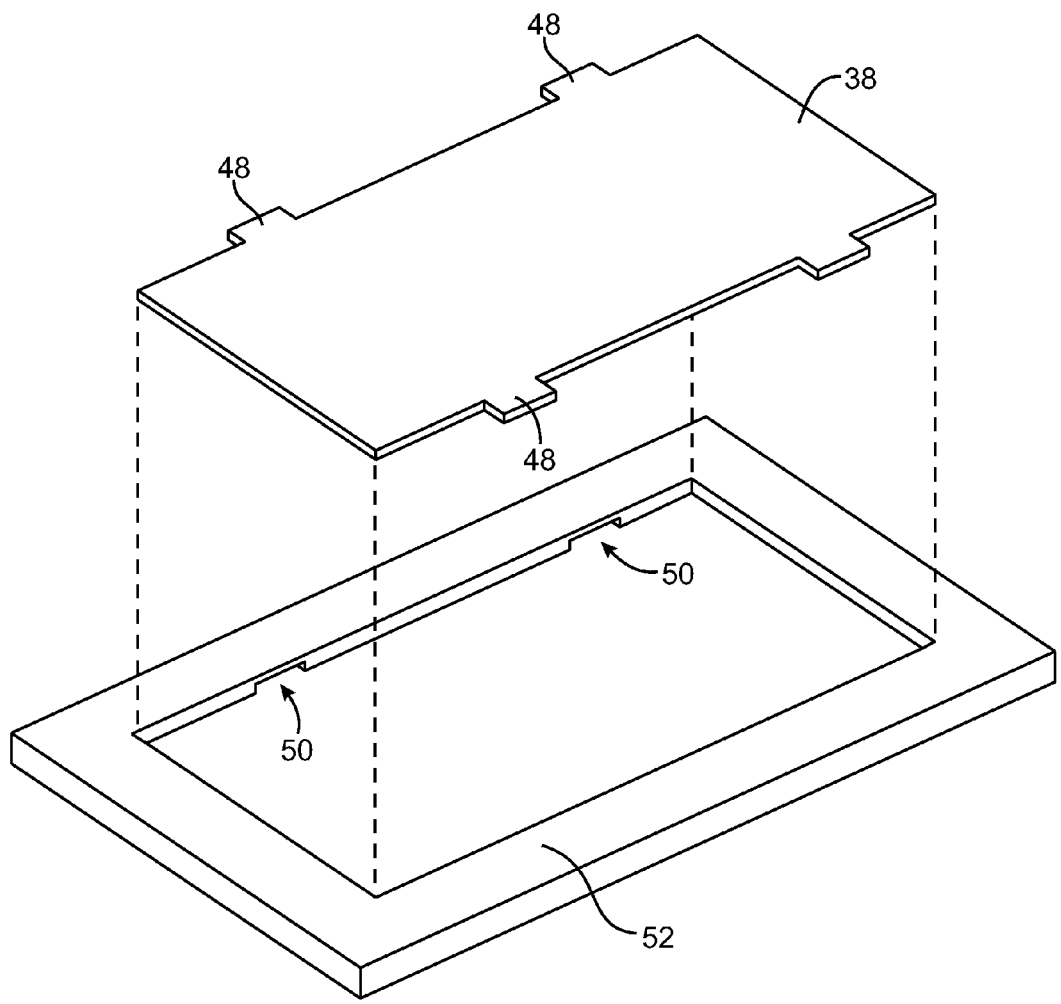
FIG. 3 is a perspective view of a light guide plate and corresponding chassis in accordance with an embodiment of the present invention.

Display structures such as light guide plate 38 may be mounted in a chassis such as chassis 52 of FIG. 3. Chassis 52 may be formed from a ring of plastic or other suitable material that serves as an interface between the structures of display 16 and surrounding portions of housing 12 (e.g., a plastic ring with a thickness of about 0.2 to 1.5 mm). If desired, chassis 52 may be formed from a plate of material that includes a rectangular recess to accommodate display structure such as light guide plate 38. Chassis 52 may be formed from housing structures (e.g., as part of a housing frame, part of a unibody housing such as a metal housing, etc.).

As shown in FIG. 3, light guide plate 38 may have protruding alignment structures such as alignment tabs 48. Chassis 52 may have corresponding recesses 50 or other alignment features that receive alignment tabs 48. Alignment tabs 48 and recesses 50 serve to align light guide plate 38 in chassis 52 and prevent light guide plate 38 from sliding within chassis 52.

Figure 4:
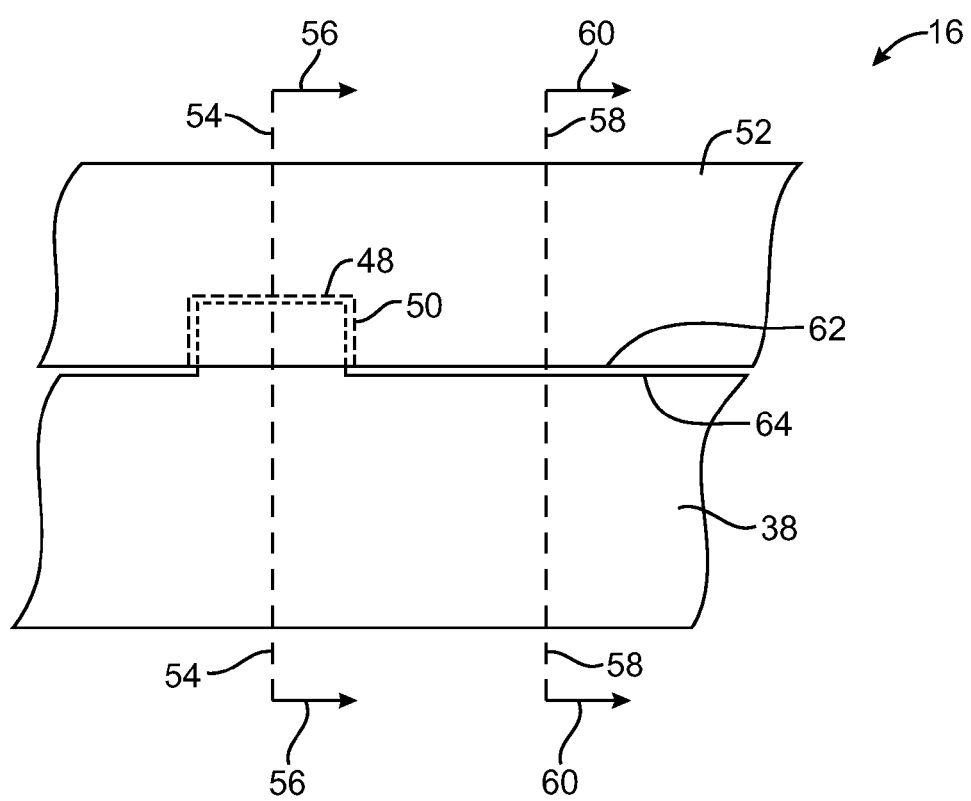
FIG. 4 is a top view of a portion of a display showing how a display chassis may be provided with recesses that receive mating tabs on a light guide plate in accordance with an embodiment of the present invention.

A top view of a portion of light guide plate 38 and chassis 52 in the vicinity of one of tabs 48 is shown in FIG. 4. As shown in FIG. 4, tab 48 may protrude into recess 50 in chassis 52. Inner peripheral edge 62 of chassis 52 runs parallel to outer peripheral edge 64 of light guide plate 38. An air gap of about 10-60 microns may separate edges 62 and 64 (as an example).

Figure 5:
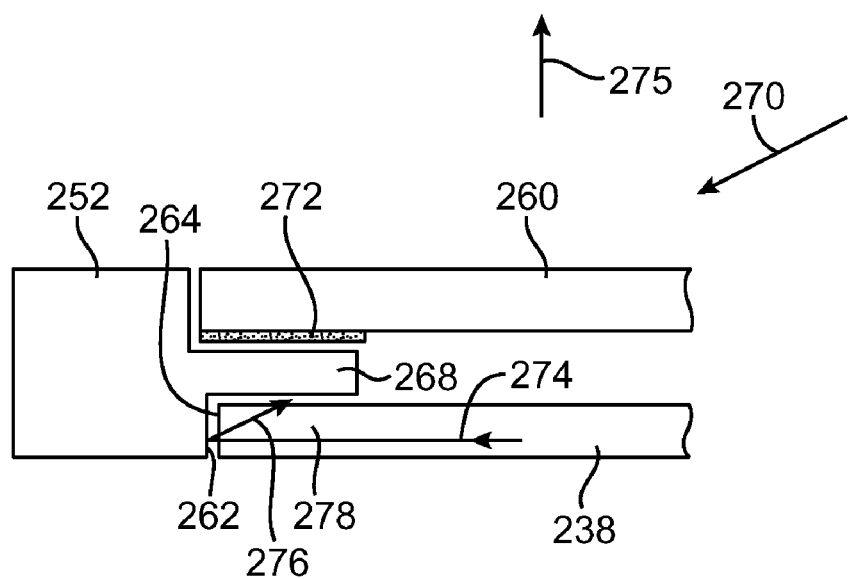
FIG. 5 is a cross-sectional side view of a conventional liquid crystal display taken through a light guide plate tab and corresponding chassis recess showing how light that is reflected from the edge of a chassis member may be blocked by an overhanging portion of a chassis.

A cross-sectional side view of a conventional display in the vicinity of a light guide tab (i.e., a sectional view taken along a line such as line 54 of FIG. 4 and viewed in direction 56) is shown in FIG. 5. As shown in FIG. 5, light 274 travels through the interior of light guide 238. Some of light 274 is scattered and reflected upwards in direction 275 and serves as backlight for a display. Some of light 274 escapes from vertical planar edge 264 of light guide plate 238 and is reflected from vertical planar edge 262 of chassis 252 (forming reflected light 276). Tab 278 is received in a recess formed under overhanging portion 268 of chassis 252. Overhanging portion 268 and black ink masking border 272 block at least some of light 276, creating a locally darkened appearance to the display when viewed in direction 270.

Figure 6:
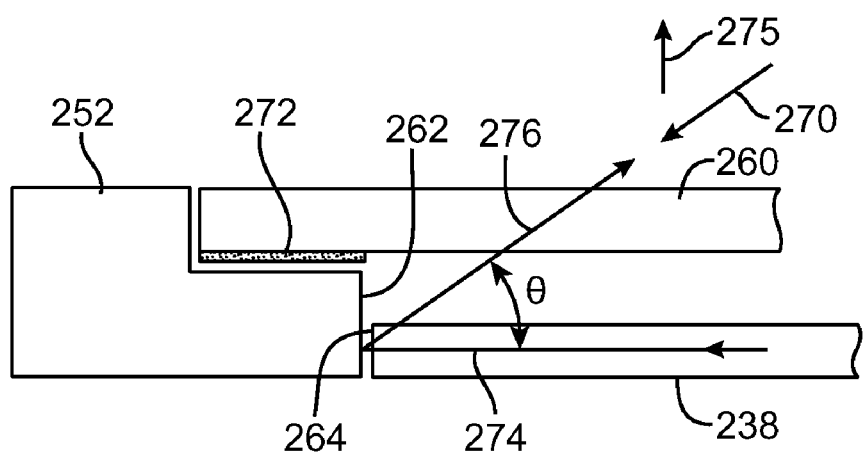
FIG. 6 is a cross-sectional side view of a conventional liquid crystal display taken through a portion of the light guide plate other than the tab showing how light that is reflected from the edge of a chassis member creates a bright stripe of excessive light intensity when viewed from the front of the display.

A cross-sectional side view of the conventional display of FIG. 5 in a portion of the display that does not include tab 278 of FIG. 5 (i.e., a sectional view taken along a line such as line 58 of FIG. 4 and viewed in direction 60) is shown in FIG. 6. As shown in FIG. 6, in portions of the display without tabs, light 274 that escapes from light guide plate edge 262 and that is reflected from chassis edge 262 as reflected light 276 is not blocked by overhanging portions of chassis 252 or black ink 272. As a result, reflected light 276 is visible in direction 270. Portions of the display that are not adjacent to edge 262 are not affected by the presence of edge 262 and do not receive reflected light such as reflected light 276. Reflected light 276 therefore creates a bright stripe of excessive light around the periphery of a conventional display.

Figure 7:
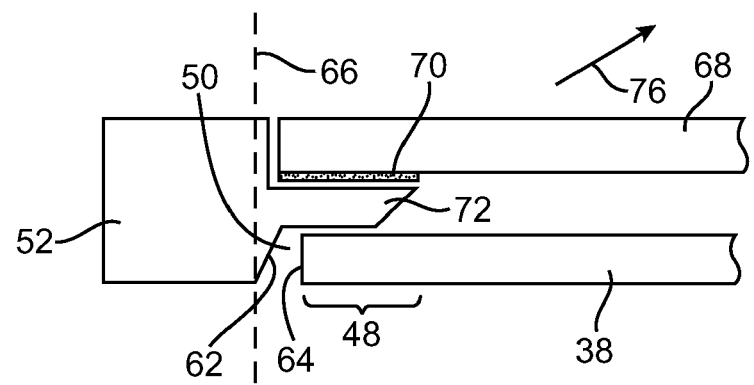
FIG. 7 is a cross-sectional side view of a display taken through a tab on a light guide plate and an adjoining beveled chassis member in accordance with an embodiment of the present invention.

A cross-sectional side view of portions of display 16 taken through line 54 of FIG. 4 and viewed in direction 56 is shown in FIG. 7. As shown in FIG. 7, tab 48 of light guide plate 38 may be received within recess 50 of chassis 52. Edge 62 of chassis 52 may, if desired, be angled (beveled) in the vicinity of edge 64 of light guide plate 48. In the arrangement of FIG. 7, edge 62 is angled downwards at a non-zero angle with respect to vertical axis 66, so that the intensity of reflected light in direction 76 is reduced. Vertical axis 66 is perpendicular to the plane in which light guide plate 38 lies and is perpendicular to the surface of display 16. With the structures of FIG. 7, reflected light in direction 76 may also be blocked by overhanging portion 72 of chassis 52 and by opaque masking layer 70 on display cover glass 68 (i.e., a border of black ink).

Figure 8:
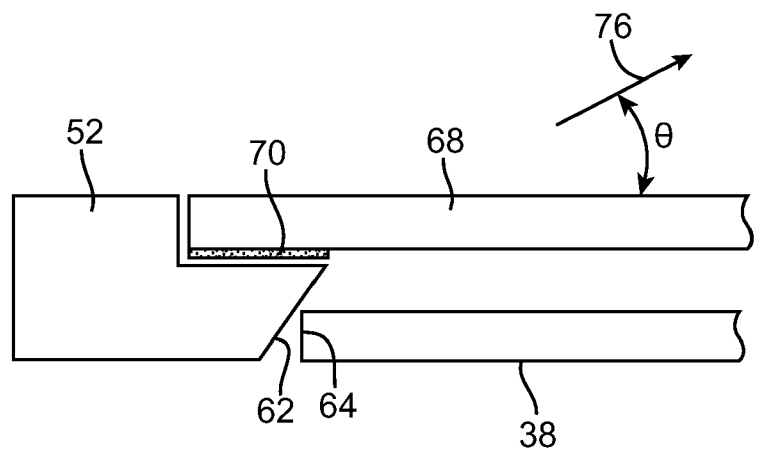
FIG. 8 is a cross-sectional side view of a display taken through a light guide plate and an adjoining beveled chassis member in accordance with an embodiment of the present invention.

A cross-sectional side view of portions of display 16 taken through line 58 of FIG. 4 and viewed in direction 60 is shown in FIG. 8. As shown in FIG. 8, edge 62 of chassis 52 may be angled downwards so that its planar surface forms a non-zero angle with respect to vertical axis 66 (and the vertical plane that is parallel to axis 66 and that contains vertical planar edge 64 of light guide plate 38).

The angle of beveled chassis edge 62 reduces the intensity of the light that is reflected from edge 62 in direction 76 after escaping from edge 64 of light guide plate 38, thereby reducing or eliminating the stripe of excess light intensity that is present along the edges of conventional displays.

Figure 9:
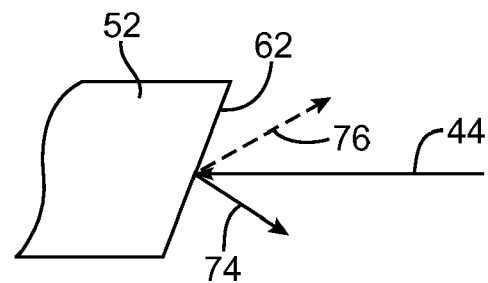
FIG. 9 is a cross-sectional side view of a beveled chassis member in a display in accordance with an embodiment of the present invention.

The way in which peripheral light intensity is reduced by the presence of the beveled shape of edge 62 of chassis 52 is illustrated in FIG. 9. Light that escapes from edge 64 of light guide plate 38 is illustrated by light ray 44. In the diagram of FIG. 9, light ray 44 is shown as traveling horizontally (i.e., parallel to the upper and lower planar surfaces of light guide 38). In practice, light travels at a range of angles about horizontal ray 44.

When light 44 strikes chassis edge 62, at least some of the light is reflected. The angle of the bevel of edge 62 affects the direction in which light is reflected from chassis 52. In the illustrative configuration of FIG. 9, most or all of light 44 is reflected downwards as shown by reflected light ray 74. Light reflections in direction 76 are eliminated or at least minimized. This eliminates or at least minimizes the bright stripe of excess light intensity that would otherwise be presence along the edge of the display (i.e., near dashed line 24 in FIG. 1).

Figure 10:
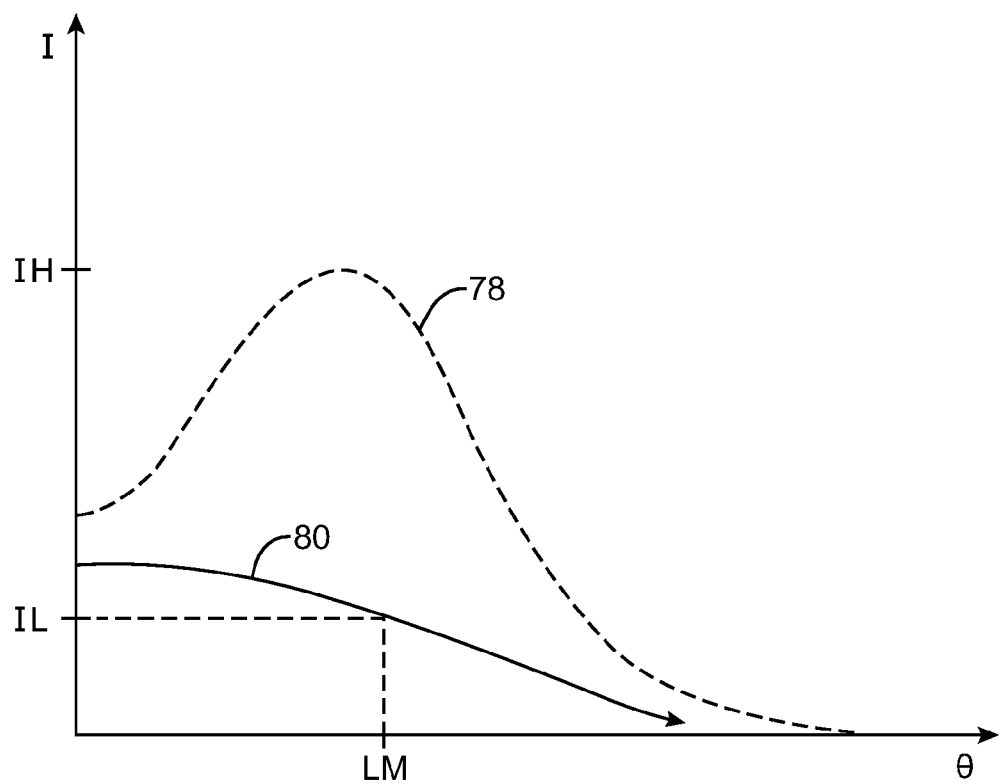
FIG. 10 is a graph showing how the use of chassis members with non-vertical edges may help reduce excessive light intensity in a light guide plate in accordance with an embodiment of the present invention.

FIG. 10 is a graph that compares the amount of reflected light in conventional displays versus displays with reflected edge light control features of the type shown in FIGS. 7 and 8. In the graph of FIG. 10, curve 78 corresponds to the intensity I of reflected light from a conventional vertical planar chassis edge such as chassis edge 262 of FIG. 6 as a function of reflection angle θ (FIG. 8). Curve 80 corresponds to the intensity I of reflected light from a chassis edge such as beveled chassis edge 62 of FIGS. 7 and 8. Because chassis edge 62 of FIGS. 7 and 8 has a shape that reduces the amount of light that is reflected in direction 76, the maximum light intensity I is reduced (i.e., from a maximum of IH for conventional displays at reflection angle LM to a reduced value of IL at reflection angle LM). Reflection angle LM may be about 10-40° and may correspond to direction 76 in FIGS. 7, 8, and 9 and direction 276 in FIGS. 5 and 6.

In the example of FIGS. 7, 8, and 9, unwanted reflections from edge 62 of chassis 52 in direction 76 were minimized by providing edge 62 with a bevel (i.e., an angle titling the surface of edge 62 away from vertical axis 66 of FIG. 7). If desired, other configurations may be used to minimize reflections in direction 76. In particular, edges 62 and 64 may be provided with textured or non-planar surfaces, edges 62 and 64 may be provided with coatings, or combinations of these types of arrangements may be used.

Figure 11:
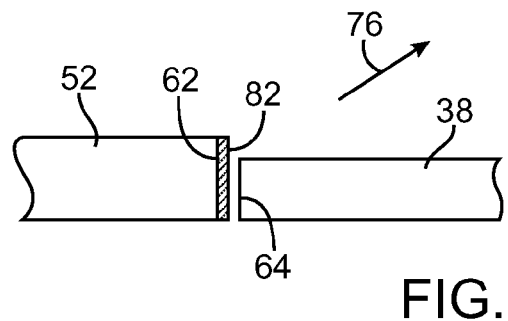
FIG. 11 is a cross-sectional side view of a light guide plate with a vertical edge and a corresponding chassis with a vertical edge that has been covered with a coating layer in accordance with an embodiment of the present invention.

As shown in FIG. 11, for example, edge 62 of chassis 52 may be provided with coating layer 82. Coating 82 may be formed from plastic, metal, ink, paint, or any other suitable material. The presence of coating 82 may reduce reflections. For example, coating 82 may be based on a light-absorbing material such as matte black ink. When light strikes a coating of this type, the coating absorbs a portion of the light and thereby minimizes the intensity of light reflected in direction 76. Coatings that absorb more light than an uncoated planar plastic surface are sometimes referred to herein a reflection-reducing coatings.

If desired, coating 82 may be formed from a reflective material such as metal. Coating 82 may, for example, be formed from a layer of silver paint or a coating of aluminum or other reflective materials (e.g., high-low dielectric stacks). With this type of coating, light reflections from the surface of edge 62 tend to exhibit increased directionality (i.e., the reflections are specular). The increased reflectivity that is provided to edge 62 when this type of reflective coating is applied to edge 62 may help enhance the ability of the bevel to direct reflected light downwards away from direction 76. Reflective coatings may be used on beveled edges, on textured edges, on non-planar edges, or on other types of surfaces.

Figure 12:
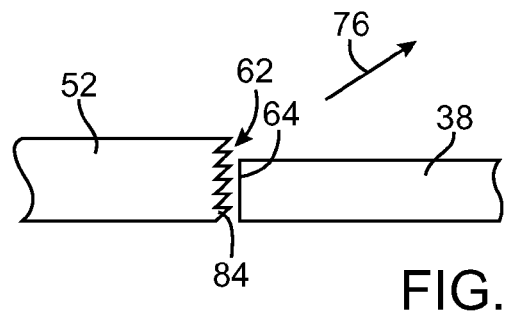
FIG. 12 is a cross-sectional side view of a light guide plate with a vertical edge and a corresponding chassis with a non-planar edge surface in accordance with an embodiment of the present invention.

FIG. 12 shows how edge 62 on chassis 52 may be provided with multiple triangular grooves (i.e., a pattern of repeating small parallel bevels that provide edge 62 with a sawtooth profile). The grooves may run parallel to one another along edge 62 and may have any suitable cross-sectional shape (i.e., triangular as shown in FIG. 12, semicircular, curved, straight, rectangular, etc.). The grooves may all be the same size or may have different sizes. If desired, edge 62 may be provided with other types of textures to reduce reflections in direction 76 (e.g., random bumps, cross-hatched grooves, etc.).

Figure 13:
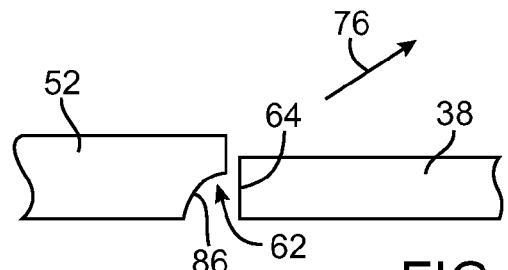
FIG. 13 is a cross-sectional side view of a light guide plate with a vertical edge and a corresponding chassis with an undercut region having a curved edge surface in accordance with an embodiment of the present invention.

As shown in FIG. 13, chassis 52 may be provided with a curved undercut. Edge 62 may, for example, have curved section 86. When light exiting light guide plate 38 strikes curved edge portion 86, the light will be directed downwards away from direction 76.

Figure 14:
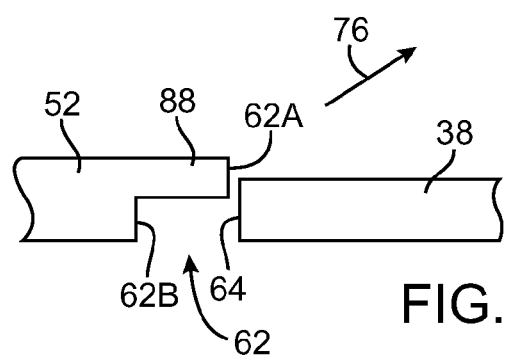
FIG. 14 is a cross-sectional side view of a light guide plate with a vertical edge and a corresponding chassis with an edge that has a rectangular undercut region in accordance with an embodiment of the present invention.

Another possible arrangement for reducing undesired edge reflections from chassis 52 is shown in FIG. 14. In the example of FIG. 14, chassis 52 is provided with a rectangular undercut so that edge 62 has upper planar surface 62A and recessed lower planar surface 62B. The presence of upper surface 62A helps hold light guide plate 38 in place. The presence of overhang 88 on chassis 52 helps block reflections of light from surface 62B in direction 76.

Figure 15:
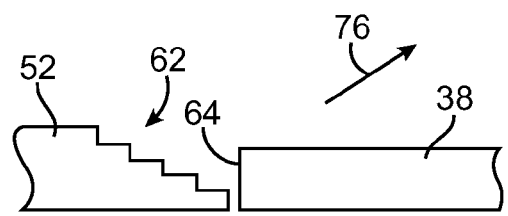
FIG. 15 is a cross-sectional side view of a light guide plate with a vertical edge and a corresponding chassis with a non-planar stepped edge surface in accordance with an embodiment of the present invention.

As shown in FIG. 15, edge 62 may be provided with multiple rectangular steps. This type of pattern may spread out the location of light reflecting from edge 62 and thereby may reduce the maximum local intensity of reflected light in direction 76. The arrangement of FIG. 15 has three rectangular steps, but edge profiles with more than three rectangular steps or fewer than three rectangular steps may be used. If desired, steps of other shapes may be formed (e.g., curved steps, triangular steps, combinations of curved, triangular, and rectangular steps, etc.).

Figure 16:
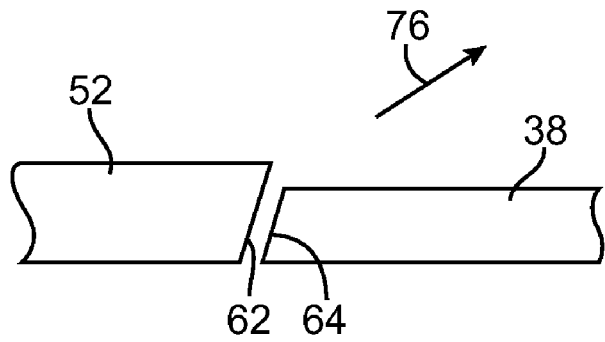
FIG. 16 is a cross-sectional side view of a light guide plate with a beveled edge and a corresponding chassis with a beveled edge in accordance with an embodiment of the present invention.

In the illustrative arrangement of FIG. 16, both edge 62 of chassis 52 and edge 64 of light guide plate 38 are beveled. The angle of edge 62 and edge 64 in this type of configuration may be matched or each edge may have a bevel of a different angle. Bevel angles that may be used for edges 62 and 64 may range from 10-30° relative to vertical, 5-45°, 4-60°, may be less than 50°, less than 40°, may be less than 20°, etc.

Figure 17:
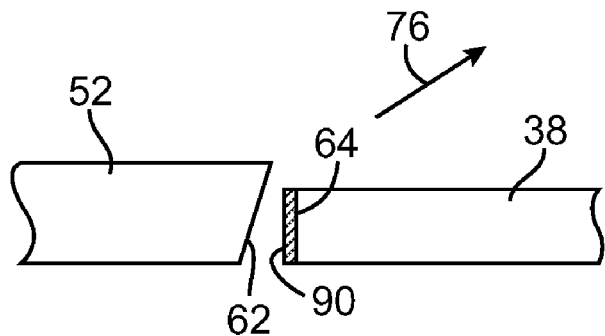
FIG. 17 is a cross-sectional side view of a light guide plate with a vertical edge that has been covered with a coating layer and a corresponding chassis with a beveled edge in accordance with an embodiment of the present invention.

FIG. 17 shows how edge 64 of light guide plate 38 may be provided with a coating such as coating 90. Coating 90 may be a light-absorbing coating (i.e., a reflection-reducing coating of matte black ink or other suitable material), etc. The presence of a light-absorbing coating such as coating 90 on end 64 of light guide plate 38 may help reduce the amount of light that exits end 64 and may thereby help reduce the amount of light that reflects from edge 62 of chassis 52. As the FIG. 17 example demonstrates, different types of reflection-reducing structures may be used simultaneously. For example, coating 90 may be provided on light guide plate 38 while chassis 52 is provided with a beveled edge.

Figure 18:
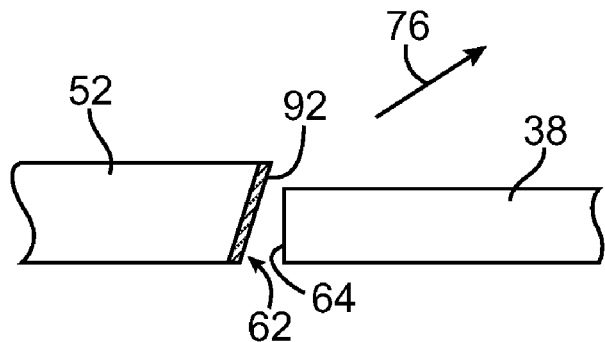
FIG. 18 is a cross-sectional side view of a light guide plate with a vertical edge and a corresponding chassis with a beveled edge that has been covered with a coating layer in accordance with an embodiment of the present invention.

As shown in FIG. 18, coatings may be provided on edges that have other reflection-reducing structures (e.g., sawtooth grooves or grooves of other shapes, other types of textures such as textures formed from bumps, step-shaped structures, curved structures, overhangs, etc.). In the FIG. 18 example, coating 92 has been provided on angled edge 62. Coating 92 may be a light-absorbing coating that helps reduce the amount of light that is reflected from edge 62 or may be a reflective coating that helps direct light downwards away from direction 76.

Reflection-reducing structures may be used in the vicinity of tabs 48 (i.e., on the protruding edges along the outer portions of tabs 48 and the corresponding edges within the mating portions of recesses 50). Preferably, reflection-reducing structures are used on the other portions of chassis 52 and light guide plate 38 (i.e., on the portions of chassis 52 and light guide plate 38 that are located away from tabs 48). Different portions of the edges of light guide plate 38 and chassis 52 may be provided with different edge treatments if desired. For example, a chassis with a rectangular opening that has four edges may have different types of reflection-reducing structures on each of its four edges. A chassis may also be provided with different reflection-reducing structures along different portions of an edge.

The foregoing is merely illustrative of the principles of this invention and various modifications can be made by those skilled in the art without departing from the scope and spirit of the invention.

What is claimed is:

1. A display, comprising:
   a display unit;
   a light guide plate that is perpendicular to a vertical axis;
   a light source that launches light into an edge of the light guide plate, wherein scattered light from the light guide plate passes through the display unit and serves as backlight for the display; and
   a chassis having a rectangular opening in which the light guide plate is mounted, wherein the rectangular opening has edges that are oriented at a non-zero angle with respect to the vertical axis.

2. The display defined in claim 1 wherein the light guide plate comprises a transparent polymer, wherein the light source comprises light-emitting diodes, and wherein the chassis comprises plastic.

3. The display defined in claim 2 wherein the display unit comprises a liquid crystal display unit.

4. The display defined in claim 2 wherein the light guide plate comprises tabs and wherein the chassis comprises recesses that receive the tabs.

5. The display defined in claim 2 further comprising a coating on the edges of the chassis.

6. The display defined in claim 5 wherein the coating comprises a reflection-reducing coating.

7. The display defined in claim 5 wherein the coating comprises a reflective coating.

8. The display defined in claim 1 wherein the edges have planar surfaces that are angled downwards and away from the vertical axis by an angle of 5-45°.

9. A display, comprising:
a liquid crystal layer;
a light guide plate that is perpendicular to a vertical axis;
a light source that launches light into an edge of the light guide plate, wherein at least some of the light scatters from the light guide plate and passes through the liquid crystal layer; and
a chassis having a rectangular opening in which the light guide plate is mounted, wherein the rectangular opening has non-planar edges.

10. The display defined in claim 9 wherein the non-planar edges comprise at least one curved edge.

11. The display defined in claim 9 wherein the non-planar edges comprise at least one edge having grooves with a saw-tooth profile.

12. The display defined in claim 9 wherein the light guide plate has tabs, wherein the chassis has recesses that receive the tabs, and wherein the non-planar edges comprise at least one edge with an undercut region in a portion of the chassis other than the recesses.

13. The display defined in claim 9 wherein the non-planar edges comprise at least one edge having a plurality of rectangular steps.

14. A display, comprising:
a liquid crystal display unit;
a light guide plate that is perpendicular to a vertical axis;
a light source that launches light into an edge of the light guide plate, wherein scattered light from the light guide plate passes through the liquid crystal display unit and serves as backlight for the display; and
a chassis having a rectangular opening in which the light guide plate is mounted, wherein the rectangular opening has edges and wherein the edges have planar surfaces that are oriented at a non-zero angle with respect to the vertical axis.

15. The display defined in claim 14 wherein the chassis comprises plastic.

16. The display defined in claim 14 further comprising a reflective coating on the edges.

17. The display defined in claim 14 wherein the light source comprises light-emitting diodes.

18. The display defined in claim 14 wherein the light guide plate has edges that are orientated at a non-zero angle with respect to the vertical axis.

19. The display defined in claim 14 wherein the light guide plate comprises edges, the display further comprising a coating of material on at least some of the edges of the light guide plate.

20. The display defined in claim 14 further comprising a coating of material on the edges of the rectangular opening.

\* \* \* \* \*